United States Patent [19]

Gaddis et al.

[11] Patent Number: 4,882,213

[45] Date of Patent: Nov. 21, 1989

[54] ABSORBENT ARTICLE WITH TEAR LINE GUIDE

[75] Inventors: Paul G. Gaddis, Renton; Lee E. Perdelwitz, Jr., Tacoma, both of Wash.

[73] Assignee: Weyerhaeuser Company, Tacoma, Wash.

[21] Appl. No.: 187,855

[22] Filed: Apr. 29, 1988

[51] Int. Cl.⁴ .............................................. B32B 9/00
[52] U.S. Cl. ................................... 428/136; 428/137; 428/138; 428/156; 428/171; 428/176; 428/210; 428/282; 428/284; 428/285; 428/286; 428/287; 428/288; 428/258; 428/326; 297/219; 297/229; 297/DIG. 5; 5/483; 5/484; 5/487; 604/367; 604/379; 604/385.1; 604/393
[58] Field of Search ............... 428/280, 137, 282, 138, 428/284, 218, 285, 136, 286, 288, 297, 298, 903, 192, 326, 920, 913, 156, 171, 172; 297/219, 229, DIG. 5; 5/483, 484, 487; 604/385.1, 367, 368, 379, 381, 393

[56] References Cited

U.S. PATENT DOCUMENTS

| | | | |
|---|---|---|---|
| Re. 30,972 | 6/1982 | Kyle et al. | 428/219 |
| D. 247,368 | 2/1978 | Whitehead | D24/51 |
| D. 253,674 | 12/1979 | Whitehead | D24/51 |
| D. 254,097 | 2/1980 | Richards | D2/225 |
| D. 254,098 | 2/1980 | Richards | D2/225 |
| D. 254,099 | 2/1980 | Richards | D2/225 |
| D. 257,084 | 9/1980 | Fuller et al. | D6/48 |
| D. 257,085 | 9/1980 | Fuller et al. | D6/48 |
| D. 257,086 | 9/1980 | Fuller et al. | D6/48 |
| D. 266,802 | 11/1982 | Gooding | D6/5 |
| D. 272,190 | 1/1984 | Sneider | D24/51 |
| D. 276,073 | 10/1984 | Whitehead | D24/51 |
| D. 283,475 | 4/1986 | Reece | D6/611 |
| 1,442,056 | 1/1923 | Edmonds . | |
| 2,652,183 | 9/1953 | Hliuka | 297/229 |
| 2,788,003 | 4/1957 | Morin | 128/284 |
| 2,990,101 | 6/1961 | Mead et al. | 229/53 |
| 3,016,599 | 1/1962 | Perry | 28/78 |
| 3,065,751 | 11/1962 | Gobbo, Jr. et al. | 5/487 |
| 3,315,676 | 4/1967 | Cooper | 5/487 |
| 3,405,031 | 11/1968 | Sisson | 162/195 |

(List continued on next page.)

FOREIGN PATENT DOCUMENTS

| | | |
|---|---|---|
| 974107 | 9/1975 | Canada . |
| 0202472 | 11/1986 | European Pat. Off. ............ 604/367 |
| 2516373 | 10/1975 | Fed. Rep. of Germany ...... 604/379 |
| 1326915 | 11/1970 | United Kingdom . |
| 2061339 | 10/1980 | United Kingdom . |

OTHER PUBLICATIONS

National Highway Traffic Safety Administration DOT Regulations 49 CFR Sections 571.213 and 571.302.
Brochure, "GGT and Gerber Camsco . . . Automation Technology for the Furniture Industry".
Exhibit, Rankin et al.
Copyright Registration VAU 98,854 for Universal Disposable Children's Car Seat Insert, issued Jul. 17, 1986.
Rankin Enterprises Children's Car Seat Cover Patterns 1001, 2002, 3003, 4004, 5005, 6006 and 7007.
Nanci Industries Brochure showing prior art Car Seat/Crandle Covers Models 801, 802, 811, 813, 831, 851, 852, 853, 861, 875, 161, 215, 122, 111, 152 and 142.
Baby Dreams promotional materials showing a prior art Infant Car Seat Cover Sketch of prior art Cloth Infant Seat Liner.
Sketch of prior art Nanci Industries, "Safe & Sound" Cloth Infant Seat Cover.

(List continued on next page.)

Primary Examiner—Ellis P. Robinson
Assistant Examiner—P. J. Ryan
Attorney, Agent, or Firm—Klarquist, Sparkman, Campbell, Leigh & Whinston

[57] ABSTRACT

An absorbent article is described which may be formed at least in part of thermoplastic and other fibers. The article is densified along a first region and has a tear line defined in the first region. A second region of lower density than the first region is provided at the termination point of the tear line to assist in stopping tearing along the tear line. In addition, densified reinforcing regions can be provided outside areas where the tear line curves or switches directions. Perforations or cuts in the tear line may extend continuously around the corner of the tear line to assist tearing around the corner.

20 Claims, 2 Drawing Sheets

U.S. PATENT DOCUMENTS

| | | | |
|---|---|---|---|
| 3,441,468 | 3/1969 | Siggel et al. | 161/169 |
| 3,477,433 | 11/1969 | Dillon | 128/290 |
| 3,501,369 | 3/1970 | Drelich et al. | 161/150 |
| 3,542,634 | 11/1970 | Such et al. | 161/88 |
| 3,556,936 | 1/1971 | Miyamoto | 162/272 |
| 3,570,491 | 3/1971 | Sneider | 128/290 |
| 3,591,875 | 7/1971 | Zipf III | 5/487 |
| 3,706,626 | 2/1972 | Smith et al. | 161/37 |
| 3,717,150 | 2/1973 | Schwartz | 128/284 |
| 3,765,997 | 10/1973 | Dunning | 161/141 |
| 3,767,452 | 10/1973 | Lauchenauer | 297/DIG. 5 |
| 3,809,606 | 5/1974 | Stansbrey | 162/194 |
| 3,881,490 | 5/1975 | Whitehead et al. | 128/287 |
| 3,888,248 | 6/1975 | Moore et al. | 128/156 |
| 3,891,157 | 6/1975 | Justus | 242/56.2 |
| 3,903,890 | 9/1975 | Mesek et al. | 128/287 |
| 3,927,673 | 12/1975 | Taylor | 128/287 |
| 3,934,285 | 1/1976 | May | 297/DIG. 5 |
| 3,971,381 | 7/1976 | Gibson | 128/296 |
| 3,996,825 | 12/1976 | Terry | 83/53 |
| 4,047,534 | 9/1977 | Thomaschefsky et al. | 128/461 |
| 4,078,124 | 3/1978 | Prentice | 429/144 |
| 4,079,739 | 3/1978 | Whitehead | 128/290 R |
| 4,082,886 | 3/1978 | Butterworth et al. | 428/284 |
| 4,100,324 | 7/1978 | Anderson et al. | 428/288 |
| 4,129,132 | 12/1978 | Butterworth et al. | 128/287 |
| 4,160,059 | 7/1979 | Samejima | 428/288 |
| 4,170,680 | 10/1979 | Cumbers | 428/195 |
| 4,182,170 | 1/1980 | Grupp | 83/177 |
| 4,188,065 | 2/1980 | Meeker | 297/485 |
| 4,196,245 | 4/1980 | Kitson et al. | 428/198 |
| 4,213,459 | 7/1980 | Siegl et al. | 604/380 |
| 4,257,842 | 3/1981 | Ciaccia et al. | 162/117 |
| 4,275,105 | 6/1981 | Boyd et al. | 428/198 |
| 4,286,030 | 8/1981 | Moore | 429/253 |
| 4,289,580 | 9/1981 | Elston et al. | 162/109 |
| 4,296,168 | 10/1981 | Ambrose | 428/288 |
| 4,315,965 | 2/1982 | Mason et al. | 428/198 |
| 4,333,979 | 6/1982 | Sciaraffa et al. | 428/179 |
| 4,381,783 | 5/1983 | Elias | 604/368 |
| 4,425,126 | 1/1984 | Butterworth et al. | 604/366 |
| 4,425,130 | 1/1984 | DesMarais | 604/389 |
| 4,429,001 | 1/1984 | Kolpin et al. | 428/283 |
| 4,443,512 | 4/1984 | Delvaux | 604/379 |
| 4,458,042 | 7/1984 | Espy | 524/14 |
| 4,478,453 | 10/1984 | Schutz | 297/219 |
| 4,488,928 | 2/1984 | Ali Khan et al. | 156/495 |
| 4,493,868 | 1/1985 | Meitner | 428/171 |
| 4,500,580 | 2/1985 | Luciani | 428/43 |
| 4,525,409 | 6/1985 | Elosh | 5/483 |
| 4,548,856 | 10/1985 | Ali Khan et al. | 428/171 |
| 4,573,986 | 3/1986 | Minetola et al. | 604/366 |
| 4,587,071 | 3/1986 | Buell | 604/379 |
| 4,609,580 | 9/1986 | Rockett et al. | 428/198 |
| 4,619,862 | 11/1986 | Sokolowski et al. | 428/221 |
| 4,620,466 | 11/1986 | Jumel et al. | 83/177 |
| 4,621,004 | 11/1986 | Madsen | 428/80 |
| 4,629,457 | 12/1986 | Ness | 604/382 |
| 4,647,497 | 3/1987 | Weeks | 428/284 |
| 4,650,481 | 3/1987 | O'Connor et al. | 604/380 |
| 4,655,877 | 4/1987 | Horimoto et al. | 162/146 |
| 4,751,134 | 6/1988 | Chenoweth et al. | 428/285 |
| 4,752,349 | 6/1988 | Gebel | 156/267 |
| 4,769,023 | 9/1988 | Goebel et al. | 604/385 |

OTHER PUBLICATIONS

Sketch of Diplomat Corp. Style 29-3 Cloth Infant Seat Cover.

Sketch of "Tailored Babyform" Cloth Infant Seat Cover, from Tailored Baby, Inc.

Sheets of Measurements of prior art Infant Car Seat/Carrier Dimensions.

The following prior art Infant Car Seats and Cover, shown in Exhibit H: Cosco/Peterson Safe-T-Seat; Cosco/Peterson Safe & Snug; Cosco/Peterson Cosco Commuter; Strollee Wee Care 610; Strolee 612; Fisher-Price Carseat; Strolee Wee Care 618; Century 400 XL; Fisher-Price Infant Seat; Questor Kwantet One-Step; Century 2000 STE; Evenflo Maxi-Mite; Cosco Day Cradle; Century 580 Infant Seat; Dyno-O-Mite by Evenflo; Kolcraft Rock n' Ride; Kolcraft Carri-Cradle; Century Kanga-Rock-A-Roo; Cosco/Peterson First Ride; Century Infant Love Seat; Collier/Keyworth CK Classic; Cosco Commuter; and Gerry Guardian.

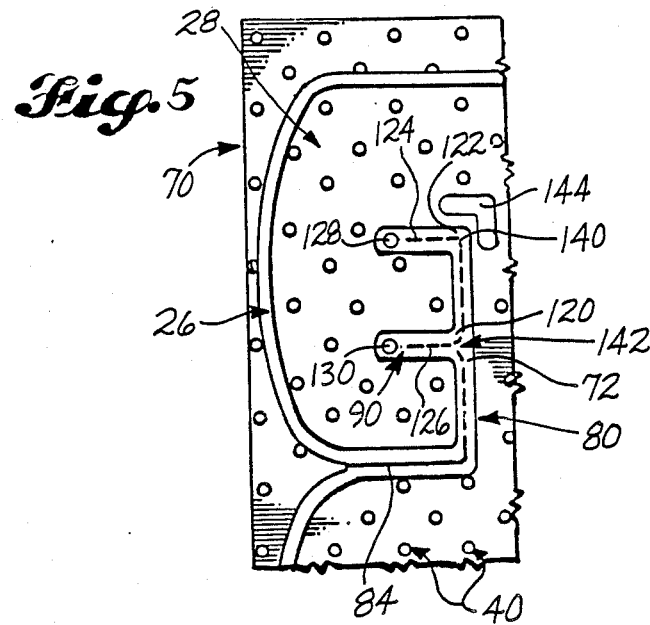
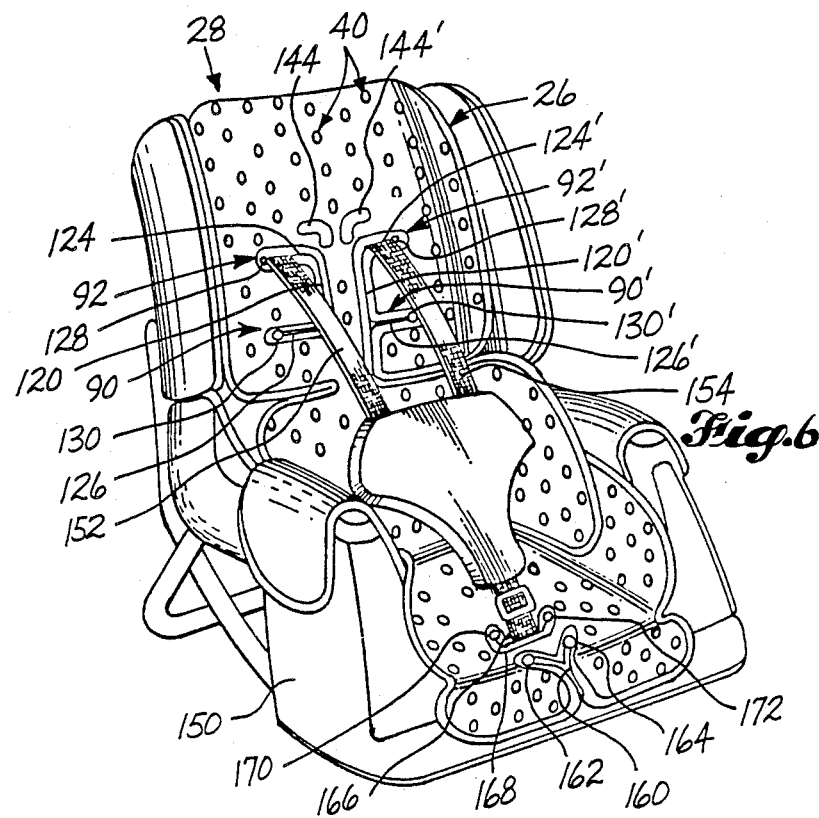

ABSORBENT ARTICLE WITH TEAR LINE GUIDE

BACKGROUND OF THE INVENTION

1. Technical Field

The present invention relates to absorbent articles which have a tear line defined thereon and a tear line guide means. The invention is particularly well suited for single or multiple layer composite tear line guide containing absorbent articles which include at least one layer formed from a mixture of thermoplastic and other nonthermoplastic fibers, such as wood pulp fibers.

2. Description of The Prior Art

Absorbent articles formed of a combination of thermoplastic and other fibers, such as wood pulp fibers, are known. However these prior articles are not known to include tear lines with means for guiding the severing of the articles along the tear line.

For example, U.S. Pat. No. 4,458,042 of Espy discloses an absorbent material comprised of a heat consolidated blend consisting essentially of wood pulp fluff and wetting agent treated spurted polyolefin pulp. This patent does not describe any tear lines, let along any tear line guide means.

U.S. Pat. No. 4,609,580 of Rockett et al. discloses an absorbent floor mat comprising a combination of a nonwoven liquid permeable wear surface, such as a nylon web, an absorbent inner layer of a coformed mixture of polymeric microfibers and wood pulp, and a liquid impervious polymer film backing layer. Intermittent bonds, such as a line pattern, within the periphery or field of the floor mat are provided. These bonds are formed by a patterned application of sonic energy or heat and pressure. These bond lines are not described or understood to be tear lines, and no tear line guide means is disclosed.

Another example of a pad which exemplifies the prior art is described in U.S. Pat. No. 4,650,481 of O'Connor et al. The pad of O'Connor et al has a liquid impermeable backing sheet, such as polymer films, an overlaying liquid permeable face sheet, such as spun bonded polypropylene, and an absorbent coform layer between the backing and face sheets. The interior of the pad is provided with a quilted pattern of compression lines. These compression lines are described as being formed by ultrasonic bonding, by heat and compression, or by the use of glue and compression. In an illustrated example, the pad is generally rectangular and the quilting lines appear to form a pattern of squares on the pad. The backing sheet is described as being generally bonded to the absorbent material by adhesive. The quilted pattern is not described or understood to form a tear line, and no tear line guide means is described in this patent.

Tear lines have been provided in other types of non-absorbent materials.

For example, U.S. Pat. No. 2,990,101 of Mead et. al. discloses a bag for milk and the like made from a flattened tubular strip of a suitable flexible plastic, such as polyethylene. In one form of bag (FIGS. 16 and 17), a heat sealed strip extends across the upper end of the bag and a pair of heat sealed sections extend downwardly from this upper sealed strip. A line of perforations extends along the top of the bag below the heat sealed strip and across the first and second heat sealed sections. Elongated cuts, at least one of which is shown to intersect an intermediate point of a perforation along the upper heat sealed strip, extend downwardly from the perforation line in these first and second heat sealed sections. These cuts terminate in holes. Mead et. al. indicates that these holes prevent the cuts from extending further into the bag, particularly across the adjoining portion of the heat sealed sections.

Pressure sensitive labels are shown in U.S. Pat. No. 3,706,626 of Smith et. al. and also have tear lines. In Smith et. al., a sheet of pressure sensitive labels is mounted to a backing sheet, such as of glassine paper. The labels are arranged in longitudinal and transverse rows. The labels in transverse rows are completely severed from the labels of adjacent transverse rows. The labels of longitudinal rows are only partially severed, as by perforations, from the labels of adjacent longitudinal rows. The backing sheet is perforated or partially severed only along the same transverse lines as the labels. Holes at the corners of the labels pass through both the label sheet and the backing sheet. These holes form notches at the edges of the strip of labels when a strip is torn from the label sheet. As described in this reference, it is easier to commence the tear across the longitudinal perforated lines when these notches are present. In contrast, Smith et. al. describes the prior art as comprising a pressure sensitive label sheet which is cut to a desired depth to define the labels, without slicing through the backing sheet.

U.S. Pat. No. 4,500,580 of Luciani describes a taping paper for sealing a gap through sheet rock, such as around a pipe. This taping paper may be doughnut shaped with concentric circular rows of tear lines. A radially extending row of perforations provides access to each of these circular rows from the edge of the taping paper. In the configuration shown in FIG. 2, this radially extending row of perforations intersects an intermediate portion of a perforation of the outermost circular row, intersects the end of a perforation of the next circular row, is positioned between perforations of the third circular row, and intersects an intermediate portion of a perforation of the innermost circular row.

Finally, U.S. Pat. No. 1,442,056 of Edmonds describes a paper sheet which is scored to define rectangular items such as blank checks. Perforations or holes are positioned along these score lines to facilitate removal of the checks from a sheet of checks. A hole is provided at the intersection of two tear lines, for example at a corner of the check. As described by Edmonds, this positioning of the hole contributes to the safe turning of the tear line in the required direction at the corner.

None of the above reference recognize any need for absorbent materials with tear lines and tear line guide means for guiding the selective tearing of such materials along the tear line.

Therefore, a need exists for improved absorbent materials and articles with a tear line guide means. In addition, a particular need exists for absorbent thermoplastic containing materials, such as of thermoplastic and other fibers, with a tear line guide means.

SUMMARY OF THE INVENTION

In accordance with the invention, an absorbent article has a body with a densified first region of a first density. A second region of a second density lower than the first density is positioned in the first region. Perforations or weakened areas are positioned within the densified first region to define at least one tear line which terminates in the second region.

In accordance with another aspect of the present invention, the articles is preferably formed in part from a mixture comprised of fibers of at least one thermoplastic material and other fibers, such as wood pulp fibers. This mixture is compressed and densified to provide first regions of a first density within which tear line defining weakened areas or perforations are positioned. The second region can then comprise an undensified or lower density area within the first densified region. The tear line terminates in the second region. Heat and pressure, such as supplied by embossing rolls, may be used to provide these densified regions. This aspect of the invention encompasses compressing the regions of the mixture of thermoplastic and other fibers regardless of how the compressed regions are formed and how the remainder of the mixture is bonded. However, in the preferred approach, the mixture is thermoboned together by heating it to a temperature above the melting point of the fibers of at least one thermoplastic material in the mixture. The thermobonded mixture is then densified by embossing in the first region.

As another aspect of the present invention, in cases where the first densified region and tear line is curved or bends around a corner, a reinforcing densified third region can be provided. This third region extends about the outside of the curve or corner and is spaced apart from the first densified region containing the tear line. If during tearing along the tear line the article is torn outside the first densified region at the corner, the third densified region helps to contain this inadvertent tearing and direct continued tearing along the desired tear line.

As still another aspect of the present invention, for tear lines extending around a corner, the perforations can comprise a cut which also extends continuously around the corner. Similar continuous cuts can be provided along locations where the tear line abruptly changes direction. Again, the article may be formed of a mixture of thermoplastic and other fibers as explained above.

In combination with the other aspects of the present invention, one or more cover layers may be included with a core to provide a composite article, such as an infant car seat liner. These cover layers may comprise thermoplastic sheet materials or webs which are thermobonded to or otherwise secured to the core. Such an infant seat liner may be provided with selectively openable areas for receiving shoulder straps, leg straps and the like of infant car seats. To fit a wide variety of infant car seats, multiple strap locations may be provided in the infant car seat liner. The strength and integrity of the liner would suffer if all of these openings were cut. Therefore, these various strap receiving positions may be defined by, for example, weakened areas along tear lines in densified areas of the liners. Typically, the densified and weakened regions extend within the interior of the infant car seat liner to permit a user to selectively tear the article a desired amount. More specifically, the weakened areas may comprise score lines, and more preferably comprise perforations formed through the liner. These perforated, opening defining, tear lines allow articles with optional openings to have such openings retained in a closed condition when not needed. A tear line guide means guides the tearing along the tear line.

In addition, by providing a tear line guide means in accordance with the present invention, the integrity of the articles is enhanced. That is, the tear line guide means of the present invention helps to confine tearing of an article along desired tear lines.

Accordingly, it is an object of the present invention to provide an improved tear line guide means for absorbent materials and articles.

Another object of the present invention is to provide a tear line guide means for articles made from thermoplastic fibers and other fibers, with or without cover sheets.

A further object of the present invention is to provide articles with tear lines that are optionally reinforced with tear line guide means for enhanced strength.

A still further object of the present invention is to provide materials and methods of efficiently manufacturing articles having tear lines and tear line guide means.

These and other objects, features and advantages of the present invention will become apparent with reference to the following detailed description and drawings.

BRIEF DESCRIPTION OF THE DRAWINGS

FIG. 5 is a front fragmentary view of a portion of an infant seat liner with a tear line guide means in acordance with the present invention; and FIG. 6 illustrates the infant seat liner of FIG. 5 in position in an infant car seat.

DETAILED DESCRIPTION OF THE PREFERRED EMBODIMENTS

Figure 1:
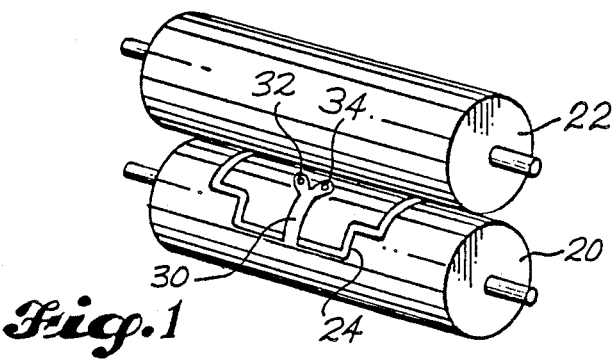
FIG. 1 is a perspective view of a pair of embossing rolls utilized in compressing and heat sealing the peripheral edges of an article, in this case an infant seat liner, with a tear line guide means in accordance with the present invention.

Although tear line guide means of the present invention may be provided in other types of absorbent materials, they are particularly well suited for use in articles having tear lines and which are made of thermoplastic fibers and other fibers. Therefore, for purposes of explanation, the invention will be described with reference to such materials.

For convenience, a thermoplastic fiber containing layer will be referred to herein as a core. However, it will be appreciated that in single layer articles or two layer laminated or composite articles, the core itself repectively comprises the article either along or with the other layer. Thus, in such cases the core would not be sandwiched between two or more cover layers.

As previously mentioned, the core can be formed from a mixture of at least one thermoplastic material in fiber form in combination with one or more other fibers. These other fibers may, and preferably do, include wood pulp fibers. The approach of U.S. Pat. No. 4,458,042 of Espy describes one method of forming such a core. Cover sheets can be thermobonded to the core during core formation. These sheets may also be adhesively or otherwise secured to the core. Such sheets may be of a variety of thermoplastic containing materials, as well as of other materials. While not structurally as strong, it is also within the scope of the present invention to include coform cores formed in the manner described in U.S. Pat. Nos. 4,650,481 of O'Connor et al. and 4,609,580 of Rockett et al.

Suitable thermoplastic core forming fibers are typically made from thermoplastic polymers, such as polyethylene and polypropylene fibers, and are commercially available. Examples of commercially available thermoplastic core forming fibers include Pulpex® E-338 from Hercules, Inc., a polyethylene based product; Kodel® from Eastman Kodak Corporation, a polyester based product; and Vinyon® from Celanese Corporation.

As previously mentioned, the other fibers mixed with the thermoplastic fibers to form the core may include wood pulp. Details of the production of wood pulp fibers are well known to these skilled in the art. These fibers are commercially available from a number of companies, including Weyerhaeuser Company, the assignee of the present application. In addition to wood pulp fibers, other nonthermoplastic synthetic and natural staple fibers, such as rayon, cotton and the like may be included in the core forming mixture.

The optimal amount of thermoplastic and other fibers for a particular blend depends upon the bond strength and other properties desired in the final absorbent core. A blend of 80% wood pulp fibers and 20% Pulpex® is one specific suitable example.

The facing layer typically comprises a preformed sheet or web of material, such as a nonwoven thermoplastic containing material. The core forming mixture can be deposited on the facing sheet to the desired depth. Thereafter, the core and facing sheet can be passed through or positioned in a thermobonder. To prevent melting of the facing sheet during thermobonding, a facing sheet can be selected with a melting point which is higher than the melting point of the thermoplastic fibers of the core which are to be melted during thermobonding. When the facing sheet and deposited mixture are heated in the thermobonder, the core fibers are thermbonded together and to the facing sheet. Of course, the facing sheet can be secured to the core following the formation of the core and the core can be formed in other ways.

A wide variety of facing sheet materials may be used. These facing sheets are typically thermoplastic, thermoplastic containing or thermoplastic coated for those applications in which the facing sheet is to be thermbonded to the core. If the facing sheets are secured to the core in another manner, such as by adhesive, then they need not be thermoplastic. Nonwoven materials are desirable facing sheets because such materials are durable and readily allow the passage of liquids to the absorbent core. Some commercially available suitable nonwoven, continuous filament, facing sheet materials include Cerex®, a nylon material from James River Corporation; Reemay®, a spun bonded polyester material from Intertec Corporation; and Sontara®, a spun laced polyester material from DuPont Corporation. Tissue is another exemplary facing sheet material.

The backing sheet may be identical to the facing sheet and may be secured to the core during or following thermbonding. However, the backing sheet may also be of a film having a melting point which is below the thermobonder temperature. In such a case, these materials may be secured to the core following the thermobonding. The backing sheet may comprise thermoplastic materials so as to permit thermobonding or thermosetting of the backing sheet along the eventual peripheral edge margin and at field bond areas of the article. Also, the backing sheet may comprise a liquid impermeable material which assists in containing liquids absorbed by the core and through the facing sheet.

Suitable backing sheet materials include, in addition to those mentioned above in connection with facing sheets, films of polyethylene, polypropylene and polyester and blends of these materials. An exmample of a commercially available suitable film is Saran® from Dow Chemical Corporation. Another example is a liquid impermeable fire retardant filled polyethylene film GF19 from Consolidated Termoplastics, Co. of Arlington Heights, Illinois.

Thus, a wide variety of suitable materials may be used in the manufacture of absorbent articles which include a tear line guide means in accordance with the present invention.

Figure 3:
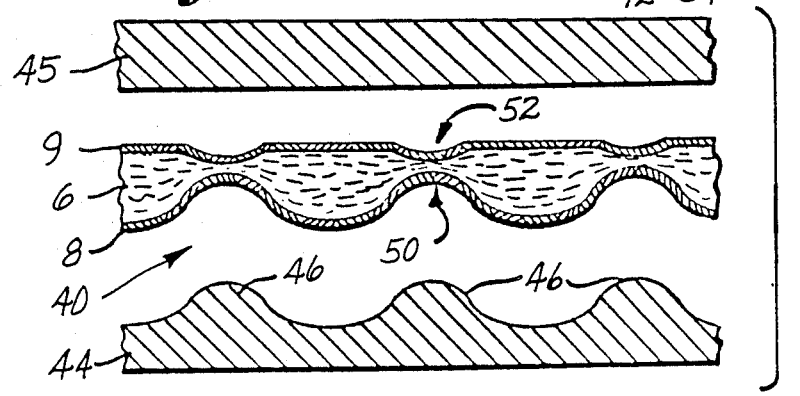
FIG. 3 is a cross-sectional view illustrating one type of composite absorbent material used in connection with the present invention as it exits from embossing rolls which compress and bond the material.

Assume a web or sheet is provided of a thermoplastic containing material, which may comprise a thermobonded or otherwise interconnected core of thermoplastic and other fibers 6 (FIG. 3) sandwiched between a facing sheet 8 and a backing sheet 9. This composite web or sheet may be densified in selected areas, such as along the eventual peripheral edge margin of an article, by passing the composite material between a heated feature forming roll 20 (FIG. 1) and a heated anvil roll 22. A raised peripheral edge margin defining contact 24 on roll 20 can be provided for this purpose. The illustrated contact 24 densifies the eventual peripheral edge margin 26 of an infant seat liner 28 as shown in FIGS. 5 and 6. The densified peripheral edge margin strengthens the article and impedes leakage of liquids through the densified edge margin to the periphery of the article.

The feature forming roll 20 may also be used to densify tear line containing locations within the field of an article. A tear line, such as defined by perforations or other weakening means, can be provided in these tear line containing locations. Contacts on the feature forming roll 20, like those indicated at 30 in FIG. 1, can be used to densify the tear line containing locations. Recessed areas, such as circular recesses 32, 34 in FIG. 1, may be provided within portions of the densifying contacts 30. These recessed areas cause the formation of areas of lesser density within the densified areas of the finished article. Tear lines, provided as explained below, may be positioned to terminate in these low density areas to assist in stopping the tearing along the tear line.

In addition, optional field bonds or densified areas, such as indicated at 40 in FIGS. 3-6, may be formed within the eventual field of the article. A pair of heated field bond feature forming and anvil rolls 44, 45 (shown in part in FIG. 3), with field bond forming contacts 46 on roll 44, may be provided to form the field bonds 40.

The above described densified areas may also be formed in other ways, such as by adhesive bonding and by ultrasonic bonding.

Figure 4:
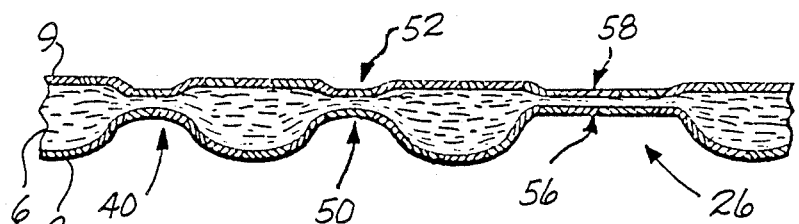
FIG. 4 is a cross-sectional view of the composite material of FIG. 3 following the formation of field and peripheral edge margin definging bonds.

FIG. 4 depicts the composite core 6, facing sheet 8 and backing sheet after the field bonds 40, edge margin bonds 26 and other bonds have been formed. As a result of field bonding, compressed or dimpled areas 50 are provided in the facing sheet surface of the composite material. In addition, a slight recess 52 is typically also visible in the backing sheet 9 due to the compression of the backing sheet during field bond formation and as a result of removal of contacts 46 from the facing sheet surface. Other field bonding patterns are also suitable.

In addition, as previously described, a densified area 26 can be provided along the eventual peripheral edge margin of the article. A compressed or recessed area 56 in the face surface defines this edge margin. A slight depression 58 is present in the backing sheet opposite the depression 56. Although variable, the densified edge margins are typically one quarter to three-eighths of an inch wide. Interior areas of an articles which are to be perforated are typically provided with slightly wider densified areas, such as areas which are about three-fourths of an inch wide.

Figure 2:
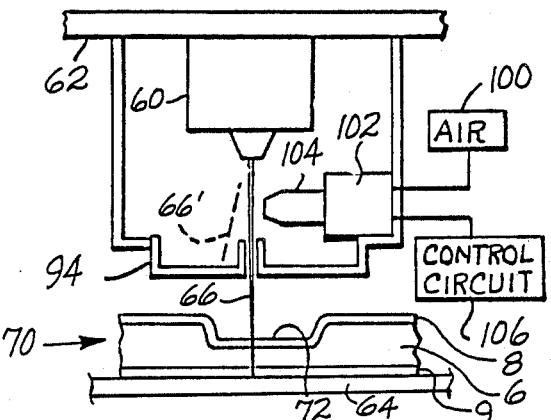
FIG. 2 is a schematic illustration of one form of an apparatus for providing perforations in absorbent articles and for cutting such articles from a sheet of material.

The web or sheets with the embossed articles may be cut by a cutting mechanism such as a die, laser, or water-knife or other cutting mechanism. A suitable water-knife cutting system is shown schematically in FIGS. 2. Devices using a water-knife for cutting strip-like material are known. U.S. Pat. No. 4,620,466 of Jumel et al. describes one such device. Similarly, a water-knife may be used in conjunction with a cutting system sold under the brand name GerberCutter by Gerber Garment Technology, Inc. of South Windsor, Connecticut. With reference to FIG. 2, a water-knife 60 is supported by a computer controlled movable support 62, such as found in the GerberCutter apparatus or the cutting machine of the aforementioned Jumel et al. patent. The sheet or web 70 to be cut is positioned on a table 64. The table is capable of moving the supported web or sheet in a direction perpendicular to the direction that the water knife is moved by support 62. This combination of motions, as described in the Jumel et al. patent, allows any arbitrary shaped article to be cut from the material. A water jet stream 66 from water-knife 60 severs the articles from the sheet 70.

FIG. 5 shows a portion of the sheet 70 having an infant seat liner 28 of the type shown in FIG. 6 defined thereon. This particular infant seat liner, as well as other products, has a densified area 72 extending within the interior of the article. This area 72 is typically formed by feature roll 20 when the densified peripheral edge margin 26 of the article is formed. To accommodate shoulder straps of various types of infant car seats, the sheet 70 is provided with plural selectively openable shoulder strap receiving locations. These shoulder strap receiving locations are defined by weakened areas that increase the manual frangibility of the material so as to facilitate selective opening of a desired shoulder strap location. These weakened areas can comprise score lines formed during die cutting of the article. However, in the illustrated liner, these weakened areas comprise perforations 80 formed in the article by water-knife 60 as the article is severed from the sheet 70.

The entire shoulder strap receiving area of the infant seat liner 28 may be perforated. Alternately, a portion thereof, indicated at 84, may be cut entirely through the pad with the remainder being perforated as shown. By perforating the infant seat liner, the user can open the liner as required to provide access to either a first shoulder strap receiving location 90 or a second shoulder strap receiving location 92. The unopened sections of the infant seat liner 28 help to maintain the integrity of the liner. For infant car seats of the type shown in FIG. 6, perforations are opened by a user to provide access to the shoulder strap receiving locations 92, 92'. In contrast, to fit other types of infant car seats, the perforations would be opened to permit positioning of the shoulder straps at shoulder strap receiving locations 90, 90'. The perforations are typically provided in the densified areas 72 of the sheet or web 70. This results in a product with a very strong edge along the opened perforations and a product which resists leakage and dusting from the edge.

To provide these perforations, the water-knife stream 66 in FIG. 2 is deflected by air to a position, shown in dashed lines at 66', which is aimed into a drainage trough 94. By repetitively deflecting and allowing the water-knife stream 66 to return to its illustrated cutting position, the cutting operation is interrupted to form perforations at desired locations in the sheet 70. Air for deflecting the water knife is provided by a source 100 through a valve 102 and to an air nozzle 104. The valve 102 is controlled by a control circuit 106 to open and close the valve as required to make the perforations. Other mechanical water-knife deflecting mechanisms may also be used, such as deflector plates which reciprocate or otherwise move into the path of the water-knife stream 66 to interrupt the stream and form the perforations. Foraminous screens, positioned over the area to be perforated, may also be used to interrupt the water jet. In addition, the perforations may be formed using other cutting methods and equipment.

The densified area 72 thus comprises a first densified region of the body of the infant seat liner. Perforations 80 define a tear line in this densified region. The illustrated tear line extends upwardly in FIG. 5 along a first tear line section 120 to a location indicated generally at 122. At location 122, the tear line abruptly changes direction. In the illustrated case, the tear line extends orthogonally from tear line section 120 along a tear line section 124. In addition, as shown, a tear line section 126 extends outwardly from tear line section 120 toward the edge of the article.

Each of the tear line sections 124, 126 terminate in a respective tear retarding or stopping region 128, 130 of a lower density than the densified region 72. The regions 128, 130 can be formed, for example, by providing recesses (like recesses 32 and 34 of FIG. 3. in the portion of the feature forming roll which densifies the section 72. Typically, regions 128, 130 are uncompressed. However, the regions 128, 130 may be partially compressed. Also, regions 128, 130 may have a basis weight which is the same as the basis weight of the remainder of the article.

When a user selectively tears the article along either the tear line 124 or 126, the tear stopping areas 128, 130 respectively assist in preventing an extension of the tearing beyond these areas at the termination points of these tear lines.

As also shown in FIG. 5, the illustrated tear line curves, and in this case passes around a right-angled corner, at the location 122. To provide additional tear line guidance, the perforation 140 at the corner extends in a first direction along the tear line path defined by perforation section 120. The perforation 140 continues and abruptly changes direction at the corner to extend along the tear line path defined by perforation section 124. The perforation 140 thus comprises a continuous cut which extends in both of these directions and around the corner. This continuous cut assists tearing of the tear line line to travel around the corner. Similarly, the perforation at location 142 extends both along the tear line section 120 and along the tear line section 126. This guides the tearing at this corner location as well.

A curved or arcuate shaped densified region 144 extends or bends around the outside of the corner location 122. Region 144 can be formed by feature forming roll 20. The densified region 144 is spaced by an undensified area from the perforations contained in densified area 72 at the corner and also from the densified area 72 itself. The densified region 144 reinforces the article at the corner. This reinforcement helps stop any inadvertent continuation of tearing beyond tear lines 120 or 124 at the corner because an extension of these tear lines intersects the densified region 144. Also, the undensified or lower density area between corner location 122 and densified area 144 behaves much like regions 128, 130 to assist in termination of the tearing.

FIG. 6 illustrates an infant car seat 150 of the type having a pair of shoulder straps 152, 154 and a leg or crotch strap 156. In this example, perforations along tear lines 120 and 124 have been opened to permit the positioning of shoulder strap 152 at the upper shoulder strap receiving location 92. Reinforcing region 144 prevents inadvertent tearing outside the tear line while the tear stopping region 92 assists in terminating the tearing at the end of tear line section 124. At the same time, the perforations along tear line 126 remain closed to assist in maintaining the integrity of the pad. Corresponding elements at the side of the infant car seat liner which receive shoulder strap 154 are identified in FIG. 6 with the same numbers as those for the shoulder strap 152 side, except a prime has been added.

While not opened for use by the specifically illustrated infant car seat, a Y-shaped leg strap receiving perforated slot 160 is provided. The perforations forming the branches of the Y-shaped slot are along tear lines which terminate in relatively low density tear line stop regions 162, 164. Regions 162, 164 are formed by the recesses 32, 34 shown in FIG. 1. The illustrated car seat 150 has a leg strap 166 positioned through a generally U-shaped slot 168 which was perforated and held closed until used. Although not shown, densified regions (like regions 144, 144') may be provided about the corners of the slot 168. In addition, relatively low density tear stop regions 170, 172 are shown at the respective ends of the upwardly extending legs of the perforations which form the slot 168.

In accordance with the invention, the tear stop regions, the reinforcing areas outside of curves or corners of tear lines, and the perforations which extend continuously about corners or curves of a tear line, are each used singly or in combination to provide an effective tear line guide means for absorbent articles.

The tear line guide means is particularly useful for absorbent articles, such as the illustrated infant car seat liner, which are made of combinations of thermoplastic and other fibers with or without cover sheets. Articles of widely varying basis weights can be provided with tear lines and a tear line guide means of the present invention. For example, this invention can be used with articles of thermoplastic and other fibers having basis weights of from 80 to 450 g/m² and up. In addition, the densified areas of such articles typically can range from 0.3 to 1.0 gm/cm³ with undensified areas falling below this range. Also, as illustrated by FIG. 6, articles of very complex shapes and with tear lines of complex shapes and corresponding tear line guide means can be produced.

Having illustrated and described the principles of our invention with reference to a number of preferred embodiments, it should be apparent to those of ordinary skill in the art that such embodiment may be modified in detail without departing from such principles. We claim as our invention all such modifications as come within the true spirit and scope of the following claims.

We claim:
1. An absorbent article comprising:
a body comprised of fiber material;
the body having a densified first region of fiber material of a first density and a second region of fiber material contained in the first region and being of a second density lower than the first density;
a weakened area positioned within the densified first region to define at least one line in such first densified region, the line terminating in the second region, whereby the line comprises a tear line along which the article may be torn.

2. An article according to claim 1 which the weakened area comprises perforations defining a line which extends around a corner, the perforations comprising a cut which extends around the corner.

3. An article according to claim 1 in which the weakened area comprises perforations which define the at least one line along which the article may be torn.

4. An article according to claim 1 in which the fiber material is comprised of a thermbonded mixture of thermoplastic and natural fibers.

5. An article according to claim 1 for an infant seat of the type having at least one strap for retaining an infant in the seat, the body comprising an infant seat liner having a lower leg supporting section, a central seat supporting section and an upper section, the fiber material comprising a core of the body, the body additionally including a cover sheet and a face sheet with the core sandwiched therebetween, the line defining at least one strap receiving slot for receiving the strap of the infant seat liner.

6. An article according to claim 4 for an infant seat of the type having at least one strap for retaining an infant in the seat, the body comprising an infant seat liner having a lower leg supporting section, a central seat supporting section and an upper section, the fiber material comprising a core of the body, the body additionally including a cover sheet and a face sheet with the core sandwiched therebetween, the line defining at least one strap receiving slot for receiving the strap of the infant seat liner.

7. An absorbent article comprising:
a body comprised of fiber material;
the body including a densified strip of fiber material and the densified strip having a curved portion;
a weakened area within the densified strip extending around the curved portion and defining a line, whereby the line comprises a tear line along which the article may be torn; and
the body also including a densified reinforcing region of fiber material which is spaced from the densified strip and positioned to extend around the curved portion of the densified strip to reinforce the article.

8. An article according to claim 7 in which the body also includes a line terminating region of fiber material of a density less than the density of the densified strip and positioned within the densified strip such that the line terminates in the line terminating region.

9. An article according to claim 8 wherein the curved portion comprises a corner and in which the weakened area comprises perforations which comprise a cut which extends around the corner.

10. An article according to claim 7 comprised of a thermobonded mixture of thermoplastic and natural fibers.

11. An article according to claim 7 for an infant seat of the type having at least one strap for retaining an infant in the seat, the body comprising an infant seat liner having a lower leg supporting section, a central seat supporting section and an upper section, the fiber material comprising a core of the body, the body additionally including a cover sheet and a face sheet with the core sandwiched therebetween, the line defining at least one strap receiving slot for receiving the strap of the infant seat liner.

12. An article according to claim 10 for an infant seat of the type having at least one strap for retaining an infant in the seat, the body comprising an infant seat liner having a lower leg supporting section, a central seat supporting section and an upper section, the fiber material comprising a core of the body, the body including a cover sheet and a face sheet with the core sandwiched therebetween, the line defining at least one strap receiving slot for receiving the strap of the infant seat liner.

13. An absorbent article comprising:
a body comprising thermoplastic fibers and natural fibers;
the body having a densified first region of fibers of a first density;
perforations in the densified first region defining a line which extends in a first direction to a first location and abruptly changes direction at the first location to extend in a second direction, the perforations comprising a continuous cut at the first locations which extends in both the first and second direction, whereby the line comprises a tear line along which the body may be torn.

14. An article according to claim 13 in which the first and second directions are generally orthogonal to one another.

15. An article according to claim 13 for an infant seat of the type having at least one strap for retaining an infant in the seat, the body comprising an infant seat liner having a lower leg supporting section, a central seat supporting section and an upper section, the thermoplastic containing fibers and natural fibers comprising a core of the body, the body including a cover sheet and a face sheet with the core sandwiched therebetween, the line defining at least one strap receiving slot for receiving the strap of the infant seat liner.

16. An article according to claim 14 for an infant seat of the type having at least one strap for retaining an infant in the seat, the body comprising an infant seat liner having a lower leg supporting section, a central seat supporting section and an upper section, the thermoplastic containing and natural fibers comprising a core of the body, the body including a cover sheet and a face sheet with the core sandwiched therebetween, the line defining at least one strap receiving slot for receiving the strap of the infant seat liner.

17. An article according to claim 1 in which the second region has a curved periphery.

18. An article according to claim 1 in which the second region is circular.

19. An article according to claim 3 and in which the line extends around a corner, in which the body also includes a reinforcing densified third region of fiber material extending about the outside of the corner and being spaced apart from the first densified region containing the line.

20. An article according to claim 13 in which the thermoplastic containing and natural fibers are thermobonded.

* * * * *